(12) United States Patent
Leary et al.

(10) Patent No.: US 10,113,316 B2
(45) Date of Patent: Oct. 30, 2018

(54) POST MOUNT CABLE RAIL INSTALLATION SYSTEM

(71) Applicant: Vinylast, Inc., Lakewood, NJ (US)

(72) Inventors: Steven J. Leary, Barnegat, NJ (US); Benjamin Yin, Hong Kong (HK); Zhang Qi, Guangzhou (CN)

(73) Assignee: Vinylast, Inc., Lakewood, NJ (US)

( * ) Notice: Subject to any disclaimer, the term of this patent is extended or adjusted under 35 U.S.C. 154(b) by 328 days.

(21) Appl. No.: 14/481,406

(22) Filed: Sep. 9, 2014

(65) Prior Publication Data

US 2016/0069103 A1    Mar. 10, 2016

(51) Int. Cl.
*E04F 11/18*    (2006.01)

(52) U.S. Cl.
CPC ... *E04F 11/1859* (2013.01); *E04F 2011/1819* (2013.01)

(58) Field of Classification Search
CPC ......... E04H 17/08; E04H 17/10; E04H 17/12; E04H 17/20; E04H 17/24
USPC ...... 256/47, 48, 49, 65.01; 403/109.1, 109.4
See application file for complete search history.

(56) References Cited

U.S. PATENT DOCUMENTS

| | | | |
|---|---|---|---|
| 3,451,657 A * | 6/1969 | Roberts | E04H 17/20 256/19 |
| 4,190,234 A * | 2/1980 | Coleman | F16G 11/12 254/232 |
| 5,411,373 A * | 5/1995 | Chiu | F04D 29/646 248/676 |
| 6,840,507 B2 * | 1/2005 | Brown | E04H 17/1434 256/65.01 |
| 6,938,882 B2 * | 9/2005 | Hadfield, Sr. | E06B 11/02 256/65.01 |
| 7,232,114 B2 * | 6/2007 | Platt | E04H 17/1413 256/65.04 |
| 7,306,203 B2 * | 12/2007 | Platt | E04F 11/1812 256/65.01 |
| 8,132,790 B2 * | 3/2012 | Cox | E01F 7/045 256/13.1 |
| 8,579,243 B2 * | 11/2013 | Leary | E04F 11/1812 248/188.1 |
| 8,814,145 B2 * | 8/2014 | Herman | E04H 17/14 256/48 |
| 9,126,289 B2 | 9/2015 | Herman | |
| 2007/0098487 A1 * | 5/2007 | Kim | B25G 1/04 403/109.1 |
| 2011/0023406 A1 * | 2/2011 | Todd, IV | E04H 3/28 52/655.1 |
| 2014/0138596 A1 * | 5/2014 | Ross | E04F 11/1859 256/47 |

* cited by examiner

*Primary Examiner* — Amber R Anderson
*Assistant Examiner* — Nahid Amiri

(57) ABSTRACT

Post mount cable rail systems and methods for installation are disclosed. A post mount system may include a mounting pipe having a plurality of threaded holes for securing at least one hardware item, and a support pipe for fitting over the mounting pipe, where the support pipe includes a plurality of holes that are aligned with the plurality of threaded holes of the mounting pipe.

20 Claims, 6 Drawing Sheets

POST MOUNT CABLE RAIL INSTALLATION SYSTEM

FIELD OF THE INVENTION

The present invention relates generally to railing systems and relates more specifically to support hardware for use in railing installations.

BACKGROUND OF THE DISCLOSURE

Post mounts are frequently used in the construction of decks, porches, stairs, and other structures that include railings. FIG. 1, for example, is a schematic illustration of a portion of an exemplary railing system 100, including a post mount 108. The railing system 100 comprises a railing 102, a support surface 104, and a plurality of posts $106_1$-$106_n$ (hereinafter collectively referred to as "posts 106"). Generally, the rail 102 is supported in a spaced-apart relation relative to the support surface 104 by the posts 106.

In order to mount the posts 106 to the support surface 104 (which may comprise, for example, wood or concrete) in a substantially invisible manner (i.e., little or no outwardly visible hardware), post mounts are often first installed in the support surface 104. For example, the post $106_1$ is mounted to the support surface via a post mount 108 (illustrated in phantom). Specifically, the post mount 108 is fastened to the support surface 104 in a secure manner, and the hollow post $106_1$ is then slipped over the post mount 108, like a sleeve. In this manner, the post $106_1$ is supported securely by the support surface 104 and in turn provides secure support for the railing 102.

Some railing systems for decks, stairs and other applications include cable rails, formed of rod cables or braided metal cables, with or without plastic sheathings. The cable rails are often used in conjunction with rigid railings and posts, which may be fabricated from plastics such as polyvinyl chloride (PVC) or pressure treated lumber, e.g., a 4×4 post. FIG. 2 illustrates, for example, a schematic illustration of a portion of an additional exemplary railing system 200 that includes cables or "cable rails" $230_1$-$230_3$. The railing system 200 also includes a railing 202, a support surface 204, and a plurality of posts $206_1$-$206_n$ (hereinafter collectively referred to as "posts 206"). Typically, an installer is required to drill a series of holes 218 in the posts 206 in order to install the cables $230_1$-$230_3$. The cables are then passed through the holes 218 and affixed to the end posts, e.g., posts $206_1$ and $206_n$, with fasteners $220_1$-$220_5$.

In some instances, a fastener may comprise a flange attached to the end of the cable such that the cable cannot be pulled out of the post to which it is affixed, e.g., fasteners $220_1$-$220_4$. In other instances, a fastener may comprise a threaded bolt and a nut, e.g., fastener $220_5$. The threaded bolt and nut may secure the cable $230_1$ in place and may further be tightened to provide a desired tension in the cable $230_1$. In another example, cable $230_2$ may be tensioned by a tensioner 240, such as a turnbuckle or similar mechanism. As illustrated in connection with cable $230_3$, a cable may further be affixed to a wall or other vertical surface, e.g., wall 250 where the railing 202 ends. For example, an end of cable $230_3$ may be hooked to a screw eye 260 that is threaded into the wall 250.

SUMMARY OF THE INVENTION

In one embodiment, the present disclosure describes a post mount system that includes a mounting pipe having a plurality of threaded holes for securing at least one hardware item, and a support pipe for fitting over the mounting pipe, where the support pipe includes a plurality of holes that are aligned with the plurality of threaded holes of the mounting pipe.

In another embodiment, the present disclosure describes a method for installing a hardware item. The method may include inserting a mounting pipe in a support pipe, where the mounting pipe includes a plurality of threaded holes for securing at least one hardware item and where the support pipe comprises a plurality of holes that are aligned with the plurality of threaded holes of the mounting pipe. In one example, at least one end of the support pipe is attached to a least one support block. The method further includes, fitting a post over the support block, the mounting pipe and the support pipe. In one example, the post has at least one hole for aligning with at least one of the plurality of threaded holes of the mounting pipe. The method then attaches a threaded portion of the hardware item to the mounting pipe via at least one of the plurality of threaded holes.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure describes a novel post mount cable rail system and method for installing such a system. The use of post mounts is favored in many applications because it allows a series of posts (and railing) to be fixed to a support surface in a clean and attractive manner, with little or no outwardly visible hardware. An exemplary post mount system is described in U.S. Pat. No. 8,579,243 titled "METHOD AND APPARATUS FOR INSTALLING A POST MOUNT" and issued on Nov. 12, 2013, the entirety of which is incorporated herein by reference. Likewise, the use of cable rails is also favored in many applications. For example, cable rails are often used under solid railings where additional security is necessary, such as on a raised deck where it is desired to prevent people and large objects from falling off the deck. Solid structures, such as additional pipes arranged in rows, columns or other designs under the railing are sometimes used. Large solid pieces of glass are also used in many instances. But the former can significantly block a view while the latter can be quite expensive. Thus, cable rails are often a good choice in the circumstances. However, where a cable rail system is desired to be used in connection with a post mount system, the installer is faced with a laborious and error-prone process. For instance, the installer must drill holes for a cable rail system through each post as well as through the post mount inside the post. The installer must also correctly form the holes through the post and through the post mount such that the holes are aligned, in order to easily pass a cable through both the post and the post mount. In addition, the cables are then secured to the outside of a post, which defeats one of the most important features of a post mount system, i.e., the ability to hide hardware. Accordingly, the present disclosure provides a post mount system that can be used in conjunction with cable rails while retaining the ability to hide hardware as in previous post mount systems. The post mount system of the present disclosure, referred to herein as a "post mount cable rail system" also allows for an easy and fast installation insofar as holes are pre-drilled/pre-fabricated in both the post mounts and posts, and are pre-aligned with one another.

Figure 1:
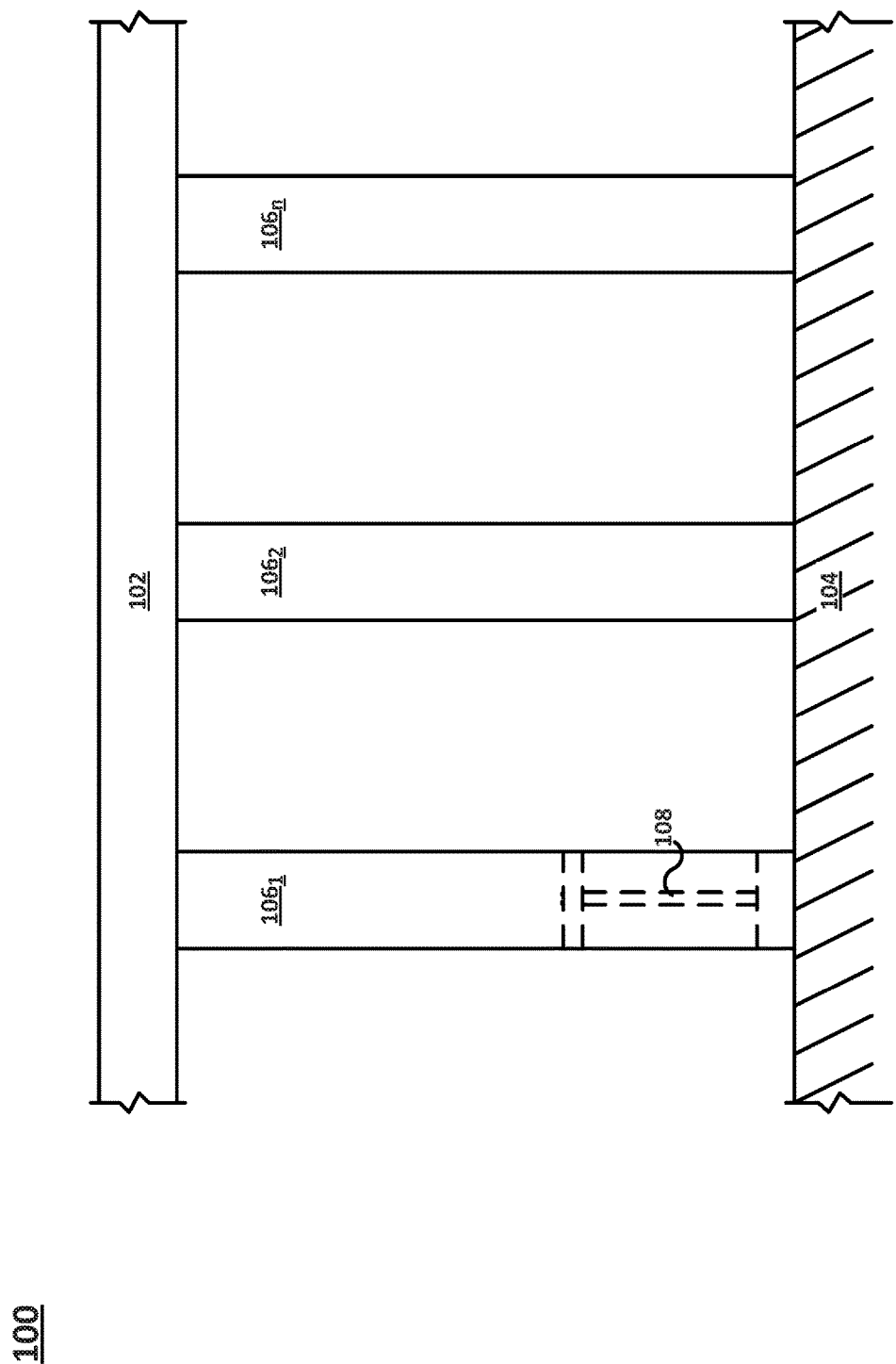
FIG. 1 is a schematic illustration of a portion of an exemplary railing system, including a post mount.
Figure 2:
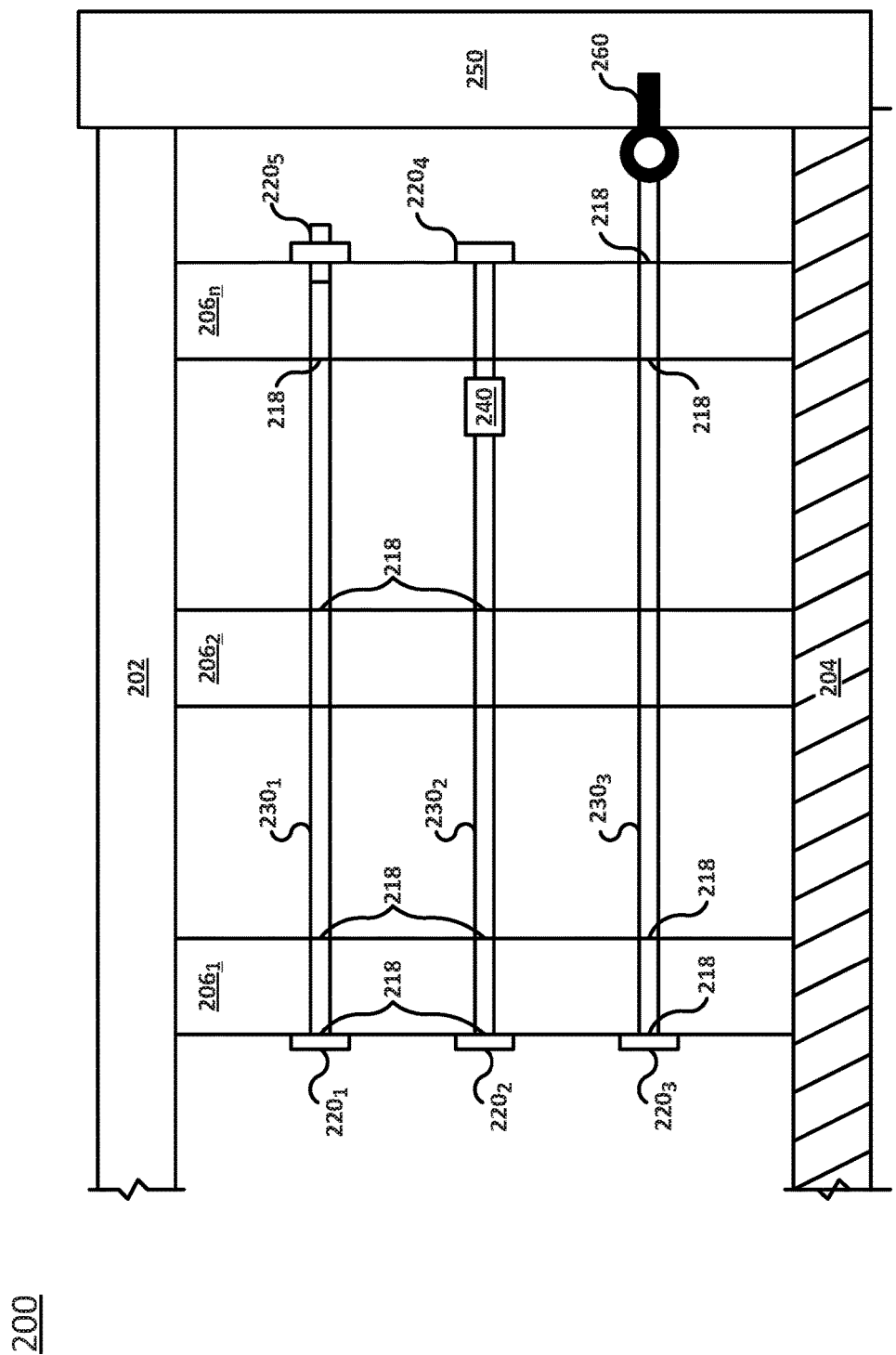
FIG. 2 is a schematic illustration of a portion of an exemplary railing system, including a plurality of cable rails.
Figure 3:
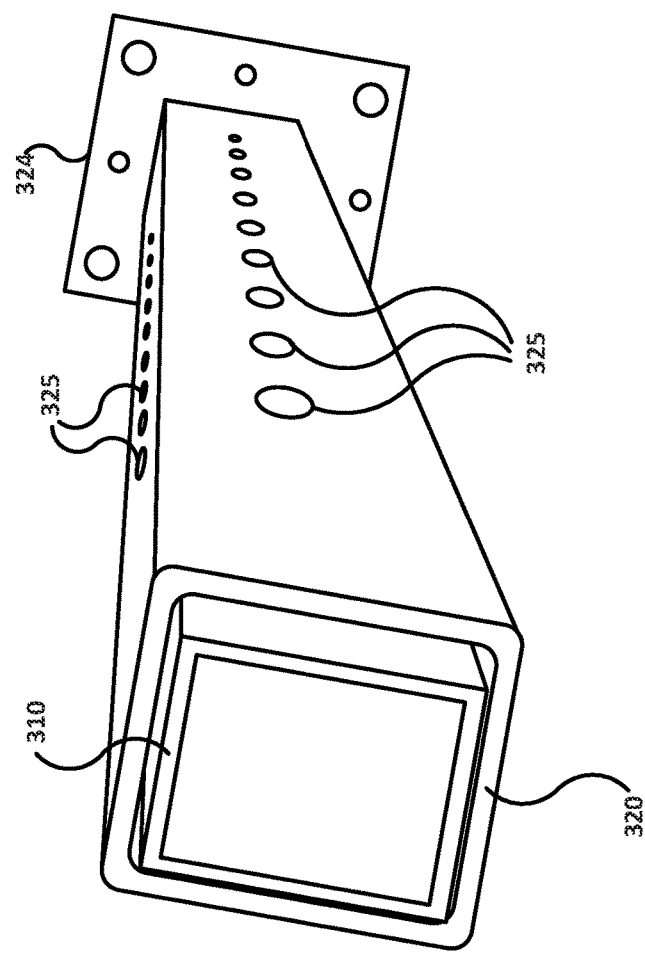
FIG. 3 is an isometric view of one embodiment of a post mount, according to the present disclosure.
Figure 4:
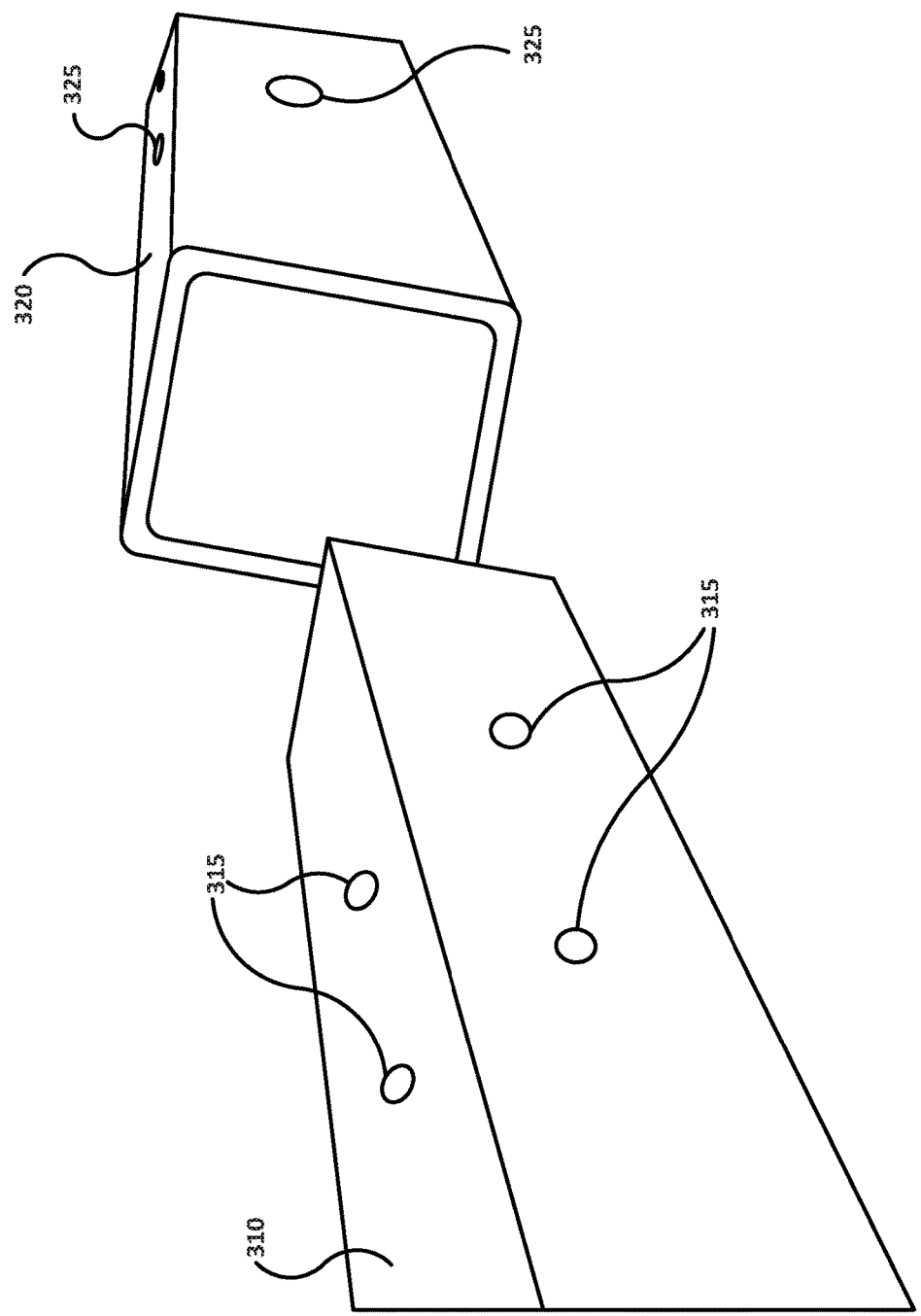
FIG. 4 illustrates another view of some of the components of the post mount illustrated in FIG. 3.

FIG. 3 illustrates an isometric view of one embodiment of a post mount 300, according to the present disclosure. FIG. 4 illustrates another view of some of the components of the post mount 300, in order to show features not clearly depicted in FIG. 3. The following description refers to features shown in both figures. Notably, the post mount 300 includes a support pipe 320 with an integral base 324. In one example, the post mount 300 includes support blocks (not shown) which may be fitted to the ends of the support pipe 320. In particular, the support blocks allow a post to be slipped over the post mount such that the post is snugly supported by the support blocks. Exemplary support blocks are further described in U.S. Pat. No. 8,579,243, the entirety of which is incorporated by reference herein.

In one example, the support pipe 320 comprises a square pipe that includes a series of holes 325 which may be pre-drilled/pre-fabricated along the length of the support pipe 320. It should be noted that the present disclosure primarily describes examples with square pipes and posts. However, the present disclosure is not so limited. For example, in other, further and different embodiments, pipes and posts of rectangular cross section, hexagonal cross section, circular cross section, and so forth may alternatively or additionally be deployed. In addition, the cross sectional shape of a post and the pipe(s) of a post mount need not comprise the same shape. For example, a hexagonal post may be used while the mounting pipe and/or support pipe of the post mount may comprise pipes with square cross sections.

In any case, in one example the holes 325 are formed in pairs that extend along the length of the support pipe 320 on opposing sides (non-adjacent sides). In particular, for cable rail applications it is necessary to pass the cables through the support pipe 320 so that the cables can pass from one side of a post to the other. In one example, holes are formed on at least two opposing sides. In another example, holes are formed on all four sides of a square post, e.g., two sets of two opposing sides. This supports applications where the post mount 300 may be used in an L-shaped corner, a T-shaped intersection, an X-shaped intersection, and so forth. In one example, the holes 325 are spaced at regular intervals, e.g., evenly spaced along the length of the support pipe 320 or in another selected pattern.

In accordance with the present disclosure, post mount 300 also includes a mounting pipe 310 fitted inside the support pipe 320. Notably, the mounting pipe 310 may have a similar construction to that of the support pipe 320. For example, mounting pipe 310 and support pipe 320 may both be fabricated from the same material such as aluminum, steel, another alloy, plastics, such as PVC, fiberglass, composites, and so forth. In one example, the mounting pipe 310 is a hollow pipe or tube. However, in another example, the mounting pipe 310 may comprise a solid rod, such as a plastic rod, a wooden rod or dowel, and so forth. In any case, the mounting pipe 310 also comprises a series of holes 315 (visible in FIG. 4, but hidden in FIG. 3) that are aligned to the holes 325 of support pipe 320. For example, the spacing of holes 315 along the length of the mounting pipe 310 may have the same spacing as the holes 325 along the length of the support pipe 320. In addition, where the support pipe 320 has holes 325 disposed on two opposite sides or on two sets of two opposite sides, the mounting pipe 310 may have holes 315 in a similar arrangement. However, in another embodiment, the support pipe 320 and mounting pipe 320 may be mismatched. For instance, a square support pipe 320 may have holes 325 along the lengths on all four sides while the mounting pipe 310 only has holes 315 on two opposite sides. In such case, the support pipe 320 and the mounting pipe 310 may still be aligned for a straight pass-through cable, but would not be useable for a railing intersection. In still another example, holes 315 may be disposed on only one side of the mounting pipe 310, e.g., wherein the mounting pipe 310 is only used to terminate a set of one or more cable rails.

In one example, the inner perimeter of the support pipe 320 is sized slightly larger than the outer perimeter of the mounting pipe 310 such that the mounting pipe 310 can be slid inside the support pipe 320 without binding, while still ensuring that the holes 325 of the support pipe 320 align with the holes of the mounting pipe 310. In one example, the holes 325 of the support pipe are sized slightly larger than the size of the holes 315 of the mounting pipe 310. In particular, the size of the holes 325 of the support pipe 320 should be large enough for easily passing through a cable and a cable anchor, e.g., substantially unhindered, depending upon the sizes of the cable(s) and cable anchor(s) used in the system. However, the holes 315 of the mounting pipe 310 may be of a smaller size. In particular, the holes 315 may comprise threaded holes such that hardware, e.g., for securing an end of a cable, can be mounted to the mounting pipe 310. Accordingly, the size(s) of the holes 315 may be such that a hardware item with a threaded portion can be threaded into a desired one of the holes 315.

It should be noted that in some instances, it is contemplated that some post mounts used in post mount cable rail systems of the present disclosure may omit a mounting pipe. For instance, a post in the middle of a rail comprising a larger number of posts does not need a mounting pipe; only the end posts may require post mounts with mounting pipes. However, in some applications it may nevertheless be desirable to include a mounting pipe in a post mount of a middle post. For example, it may be desirable to include one or more decorative hardware items and/or functional hardware items. In another scenario, the post may be used at a T-shaped intersection of two rails, and so forth. For instance, an eye bolt, hook bolt, or the like may be installed to provide an anchor for a rope or line, to secure a hanging plant, and so forth. Accordingly, in such instances the size of the holes 315 may be such that threaded hardware can be secured, while still allowing one of the cables to easily pass through, e.g., substantially unhindered. In one example, all or a portion of the holes 315 are fabricated using flow drilling, where the threading is created at the same time the hole is drilled.

Figure 5:
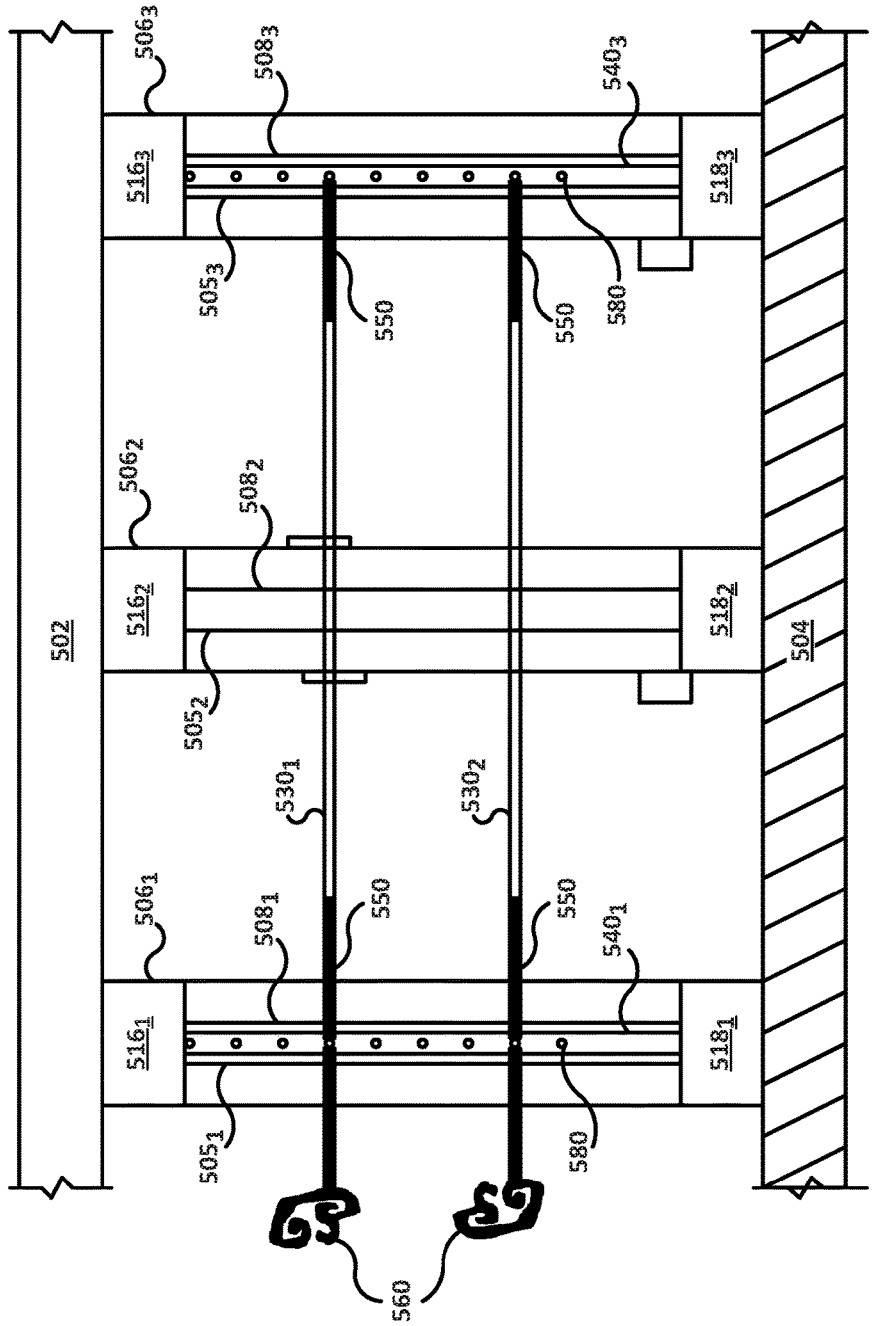
FIG. 5 is a schematic illustration of a portion of an exemplary post mount railing system, including a plurality of cable rails.

FIG. 5 illustrates an exemplary post mount cable rail system 500 according to the present disclosure. As in existing post mount systems, system 500 includes a railing 502 and posts $506_1$-$506_3$ secured to a support surface 504 using a plurality of post mounts $505_1$-$505_3$. Each of the post mounts $505_1$-$505_3$ includes a respective support pipe $508_1$-$508_3$, and one or more support blocks $516_1$-$516_3$ and $518_1$-$518_3$. As illustrated in FIG. 5, post mounts $505_1$ and $505_3$ further include mounting pipes $540_1$ and $540_3$ respectively. Each of the mounting pipes $540_1$ and $540_3$ has a series of holes 580 disposed on one or more sides of each of the respective mounting pipes. The holes 580 may comprise flow drilled holes, or are otherwise threaded such that a hardware item with a threaded portion can be affixed to the mounting pipes $540_1$ and $540_3$ using at least one of the holes 580. Notably, the posts $506_1$-$506_3$ as well as the support pipes $508_1$-$508_3$ may all have respective series of holes for allowing cables to pass through. However, for ease of illustration, such holes are not shown in FIG. 5. It should also be noted that at least some of the holes from one post to the next, and from one support pipe and/or mounting pipe to the next, may all be aligned (i.e., in a straight line or a substantially straight line) such that a cable can be extended along a rail through a number of posts and posts mounts.

As illustrated in FIG. 5, four threaded anchors 550 are used to secure cables $530_1$ and $530_2$ in place. As further illustrated in FIG. 5, post $506_2$ includes a post mount $505_2$ with a support pipe $508_2$, but it does not include a mounting pipe. In particular, for posts that do not need to secure a hardware item, the post mount can omit a mounting pipe. Therefore, an entire railing system can be installed using less mounting pipes than the number of required posts, post mounts, support pipes, and so forth. For example, for a single straight railing with ten posts, only two mounting pipes may be required; one for each end. Nevertheless, as described above, in another embodiment a mounting pipe may optionally be installed in a mid-span post mount, e.g., post mount $505_2$. For example, the rail 502 may be joined to or meet another rail in a T-shaped intersection at post $506_2$, or it may be desired to install decorative or functional hardware on one of the sides of the post $506_2$ through which the cables $530_1$ and $530_2$ do not pass.

FIG. 5 further illustrates the installation of two additional threaded hardware items 560. For example, hardware items 560 may comprise decorative or functional hardware installed in the mounting pipe $540_1$ of post $506_1$. However, it should be noted that hardware items 560 can be installed in any available hole 580 that is not used for a cable rail. Thus, hardware items 560 may be installed at an end post, or may be installed at a mid-span post, such as post $506_2$ when optionally provided with a mounting pipe.

Notably, post mount cable rail system 500 can be fabricated in ready-to-assemble pieces such that an installer can quickly and easily install the system. For example, the mounting rods $540_1$ and $540_3$, and the support rods $508_1$-$508_3$ can all be pre-drilled or otherwise pre-fabricated to include holes in the desired locations such that an installer on site does not need to measure and drill any holes. Similarly, the posts $506_1$-$506_3$ themselves can be fabricated with holes in desired locations for cables to pass through or to allow hardware to be secured to a mounting pipe. For instance, if it is known that post $506_3$ will be used as an end post, holes may be prefabricated on only one side to allow the threaded anchors 550 to be installed.

In one example, an installer may have a choice as to the number of cables to be used. Thus, the posts and post mounts may have a larger number of holes than will ultimately be used by the installer. As such, in one embodiment, the system 500 may include one or more low-profile plugs to place in unused post holes. For example, if the post is fabricated from PVC, the plug may comprise a round, square, or other-shaped cap that fits within and over the hole, and may be of the same color as the post itself. These and other variations will be apparent to those skilled in the art and are all contemplated within the scope of the present disclosure.

Figure 6:
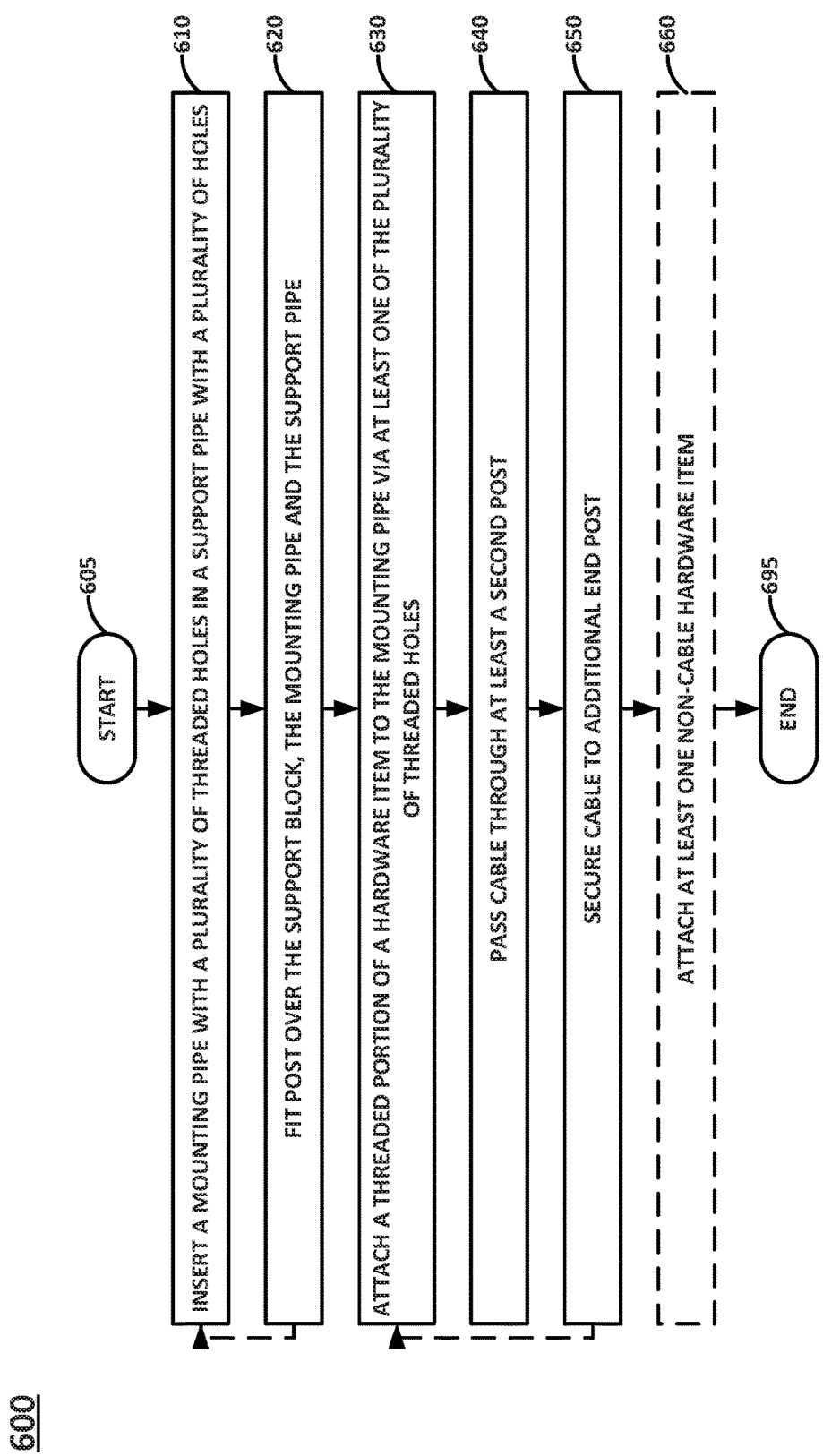
FIG. 6 is a flow diagram illustrating one embodiment of a method for adjusting a post mount so that a post placed over the post mount is plumb in the vertical direction.

FIG. 6 is a flow diagram illustrating one embodiment of a method 600 for installing a post mount cable rail system according to the present disclosure. For example, the method 600 may be used to install at least a portion of the post mount cable rail system 500 illustrated in FIG. 5.

The method 600 is initiated in step 605 and proceeds to step 610. In step 610 a mounting pipe is inserted into a support pipe. For example, the mounting pipe may comprise a plurality of threaded holes for securing at least one hardware item. Similarly, in one example, the support pipe may comprise a plurality of holes that are aligned with the plurality of threaded holes of the mounting pipe. In one example, the support pipe is attached to a least one support block. Collectively, the mounting pipe, the support pipe and the at least one support block may comprise a first post mount unit.

In step 620, a post is fitted over the support block, the mounting pipe and the support pipe. In other words, the post is fitted over the first post mount unit. In one example, the post comprises at least one hole for aligning with at least one of the plurality of threaded holes of the mounting pipe.

In step 630, a threaded portion of the hardware item is attached to the mounting pipe via at least one of the plurality of threaded holes. For example, the threaded portion of the hardware item may be passed through the at least one hole of the post and through at least one of the plurality of holes of the support pipe. In one example, the hardware item comprises an anchor of a cable, or cable rail. In one example, step 630 may also include securing a cable to the hardware item. For instance, the cable and the anchor may first need to be attached to one another prior to the anchor being secured to the mounting pipe.

At step 640, the cable is passed through at least a second post. For example, step 630 may comprise securing the cable to an end post via a mounting pipe, whereas step 640 involves threading the cable through one or more mid-span posts of the post mount cable rail system. Step 640 may further include threading the cable through holes in a support pipe and/or a mounting pipe of at least one of the mid-span posts.

At step 650, the cable is secured to a second end-post via a second mounting pipe of a second post mount unit. For example, the second post mount unit may be assembled using the same or a similar process to that described above in connection with steps 610 and 620. Thus, FIG. 6 illustrates an optional loop from step 620 back to step 610 where such steps may be repeated with respect to the second post mount, with respect to a third post mount, and so on. Likewise, step 650 may involve securing the cable to the second mounting pipe via one of a plurality of threaded holes of the second mounting pipe using an additional threaded anchor of the cable.

Following step 650, the method 600 may return to step 630 where steps 630-650 may be repeated with respect to at least one additional cable. For instance, a single railing may have a top railing and two or more cables arranged below the top railing. Thus, each of the cables may be installed in a similar manner to that which has been described.

At optional step 660, at least one non-cable hardware item is attached. For example, a non-cable hardware item may comprise any decorative or functional hardware item that is not used for securing a cable. For instance, a threaded portion of the at least one non-cable hardware item may be threaded into a hole of a mounting post to provide a decoration, to provide a hook to hang or secure other items, and so forth.

Following step 660, the method 600 proceeds to step 695 where the method ends. It should be noted that in various embodiments, one or more of the above steps of the method 600 can be deemed as an optional step. Furthermore, operations, steps or blocks of the above described method(s) can be combined, separated, and/or performed in a different order from that described above, without departing from the example embodiments of the present disclosure.

Although various embodiments which incorporate the teachings of the present disclosure have been shown and described in detail herein, those skilled in the art can readily devise many other varied embodiments that still incorporate these teachings. In addition, while various embodiments have been described above, it should be understood that they have been presented by way of example only, and not limitation. Thus, the breadth and scope of a claimed embodiment should not be limited by any of the above-described exemplary embodiments, but should be defined only in accordance with the following claims and their equivalents.

What is claimed is:

1. A post mount system, comprising:
   a mounting pipe, wherein the mounting pipe comprises a first plurality of holes, each hole of the first plurality of holes including a plurality of threads to secure a hardware item that attaches to an end of a cable rail;
   a support pipe for fitting over the mounting pipe, wherein the support pipe comprises a first end, a second end, and a second plurality of holes that are aligned with the first plurality of holes of the mounting pipe;
   a post for fitting snugly over the support pipe;
   the hardware item, wherein the hardware item includes a threaded portion, wherein the threaded portion is for attaching the hardware item to the mounting pipe by engaging the plurality of threads of a first hole of the first plurality of holes, and wherein the hardware item comprises an anchor for the cable rail; and
   the cable rail, wherein the cable rail comprises a cable that is sized for passing substantially unhindered through the second plurality of holes of the support pipe.

2. The post mount system of claim 1, wherein the cable is further sized for passing substantially unhindered through the first plurality of holes of the mounting pipe.

3. The post mount system of claim 1, wherein the post comprises at least one hole for aligning with at least one of the first plurality of holes of the mounting pipe.

4. The post mount system of claim 1, wherein the mounting pipe comprises a steel tube.

5. The post mount system of claim 1, wherein the mounting pipe comprises a tube with a rectangular cross section.

6. The post mount system of claim 1, wherein the first plurality of holes of the mounting pipe comprises flow-drilled holes.

7. The post mount system of claim 1, wherein the first plurality of holes of the mounting pipe are spaced at a regular interval.

8. The post mount system of claim 7, wherein the second plurality of holes of the support pipe are spaced at the same regular interval as the first plurality of holes of the mounting pipe.

9. The post mount system of claim 1, wherein the plurality of holes of the support pipe include at least a first hole on a first side of the support pipe and a second hole on a second side of the support pipe, wherein the second side is opposite to the first side and wherein the first hole and the second hole are aligned for passing a cable of a cable rail through both the first hole and the second hole.

10. The post mount system of claim 1, wherein the mounting pipe comprises an aluminum tube.

11. The post mount system of claim 1, wherein the mounting pipe comprises a wooden rod.

12. The post mount system of claim 1, wherein the support pipe includes an integral base at one end.

13. The post mount system of claim 1, wherein the threaded portion is sized for passing substantially unhindered through the second plurality of holes of the support pipe.

14. A post mount system, comprising:
    a mounting pipe, wherein the mounting pipe comprises a first plurality of holes, each hole of the first plurality of holes including a plurality of threads to secure a hardware item that attaches to an end of a cable rail;
    a support pipe for fitting over the mounting pipe, wherein the support pipe comprises a first end, a second end, and a second plurality of holes that are aligned with the first plurality of holes of the mounting pipe;
    a post for fitting snugly over the support pipe; and
    a first support block fitted around an outside of the first end of the support pipe and positioned inside the post.

15. The post mount system of claim 14, further comprising:
    the cable rail, wherein the cable rail comprises a cable that is sized for passing substantially unhindered through the second plurality of holes of the support pipe.

16. The post mount system of claim 14, wherein the post comprises at least one hole for aligning with at least one of the first plurality of holes of the mounting pipe.

17. The post mount system of claim 14, wherein the plurality of holes of the support pipe include at least a first hole on a first side of the support pipe and a second hole on a second side of the support pipe, wherein the second side is opposite to the first side and wherein the first hole and the second hole are aligned for passing a cable of a cable rail through both the first hole and the second hole.

18. The post mount system of claim 14, wherein the first plurality of holes of the mounting pipe comprises flow-drilled holes.

19. The post mount system of claim 14, wherein the first plurality of holes of the mounting pipe are spaced at a regular interval.

20. The post mount system of claim 14, wherein the second plurality of holes of the support pipe are spaced at the same regular interval as the first plurality of holes of the mounting pipe.

* * * * *